United States Patent Office 3,116,824
Patented Jan. 7, 1964

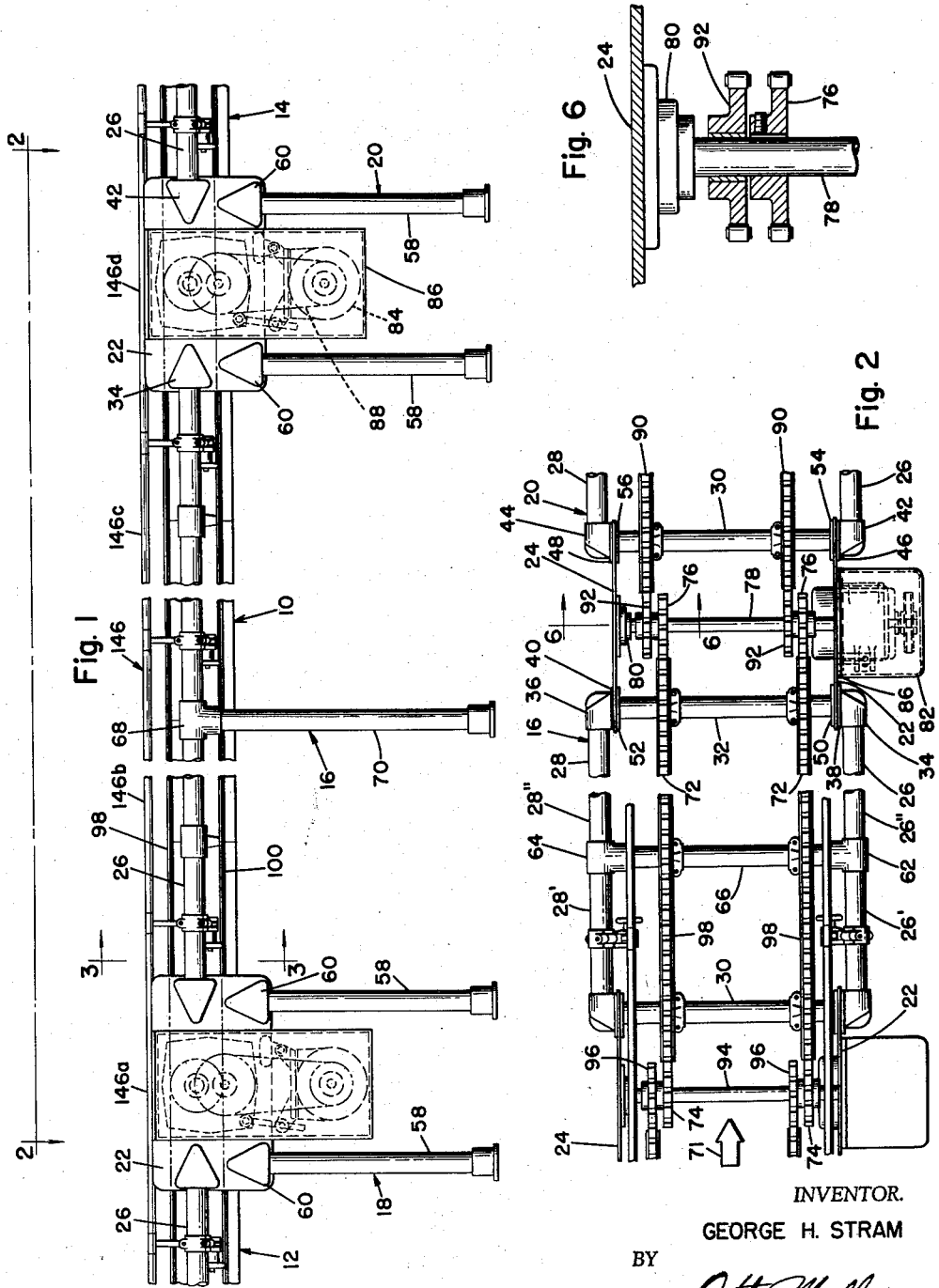

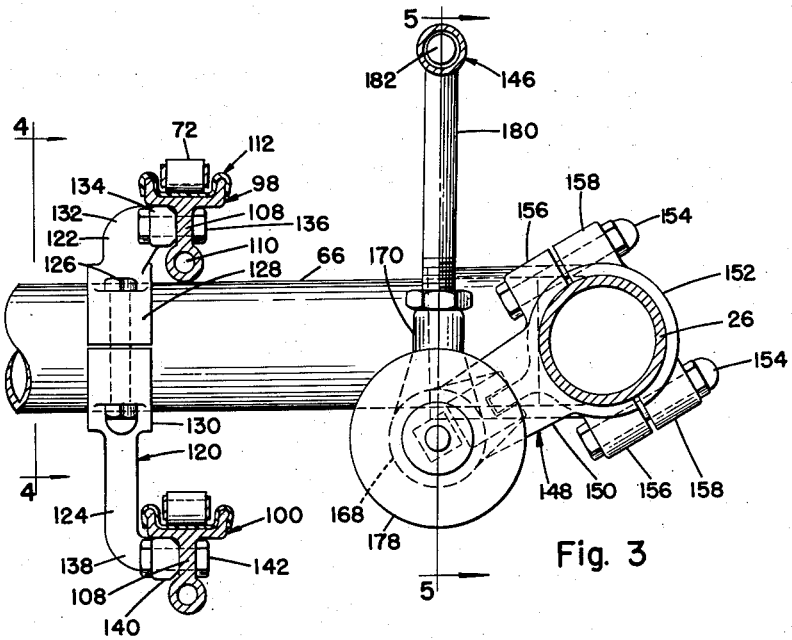
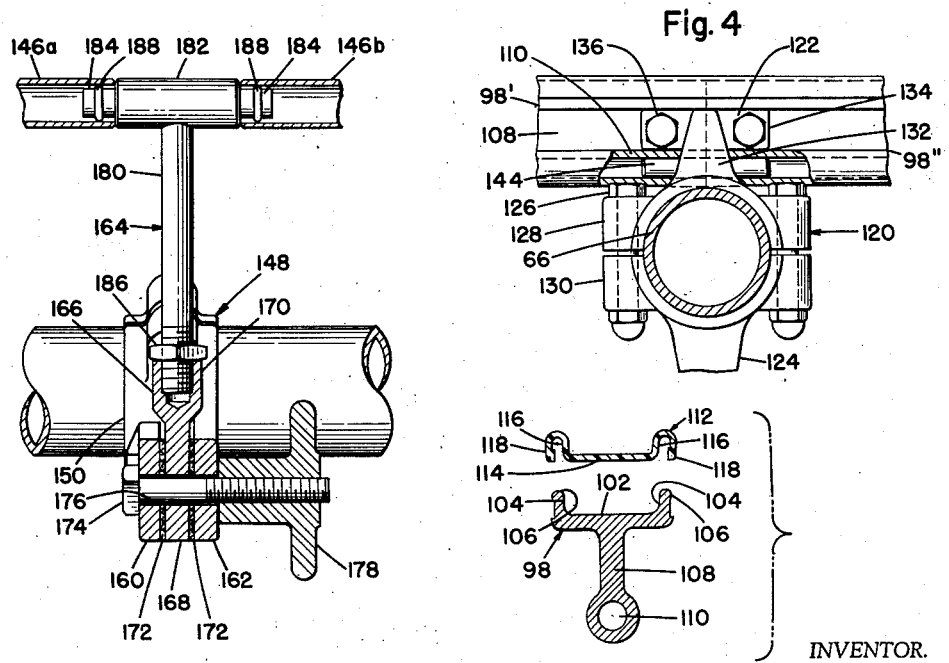

3,116,824
CONVEYOR TROUGH STRUCTURE
George H. Stram, Hellam, Pa., assignor, by mesne assignments, to Baker Perkins Inc., New York, N.Y., a corporation of New York
Filed May 24, 1961, Ser. No. 112,355
7 Claims. (Cl. 198—204)

This invention relates to conveying means and more particularly to conveying means having parallel transversely spaced endless conveyor elements for moving articles therealong.

It is a primary object of the invention to provide conveying means of the above type which is particularly well adapted for use in bakeries and the like, for conveying pans along a conveyor or a system of end to end related conveyors with a minimum of jarring, which is an important feature, particularly when the conveyor or conveyor system is employed for transporting straps of pans containing raised dough.

Another object is to provide in such conveying means novel support and guide means for the load supporting run and preferably also the return run of the endless conveyor elements whereby the conveying means handles the pans gently and subjects them to a minimum of jarring. A related object is to provide such support and guide means with means whereby they may be formed in short lengths for convenience in storage, shipping and handling and which can be assembled in the field in exact alignment.

Another object is to provide guide supports for the endless conveyor elements wherein the parts in contact with the endless conveyor elements are easily replaceable and provide for operation of the endless conveyor elements with a minimum of friction and noise.

A further object is to provide novel conveying means which is of open construction and wherein the component parts thereof are formed to eliminate or minimize surfaces on which crumbs or dirt can collect in order to provide a maximum of sanitation.

Another object is to provide a conveyor of the aforementioned type having laterally spaced pan guides formed of a plurality of flexibly connected sections that are manually adjustable without the use of tools relative to each other and with respect to the pans to vary the spacing between the guides at opposite sides of the pans at different locations longitudinally of the conveyor.

Another object is to provide conveyors of the aforementioned type formed of elements that are easily assembled in the field, and are adapted to be worked on in the field by comparatively simple tools to permit adapting and erecting of the conveyors to the exact length that the space and other factors met with in the field dictate.

Other objects and advantages reside in certain novel features of construction, arrangement and combination of parts which will be hereinafter more fully described, reference being had to the accompanying drawings showing an exemplary embodiment of the invention. Referring to the drawings:

FIGURE 1 is a view in side elevation of a conveyor embodying the invention with the end portions of connecting conveyors at the terminal ends thereof;

FIGURE 2 is a top plan view of the adjacent ends of two conveyors of the conveying system;

FIGURE 3 is an enlarged sectional view taken on line 3—3 of FIGURE 1 showing one side of the conveyor, it being understood that the opposite side of the conveyor is of similar construction;

FIGURE 4 is a view taken on line 4—4 of FIGURE 3 with parts broken away showing the connection between the adjacent end portions of two sections of the guide support for one of the endless conveyor chains;

FIGURE 5 is a sectional view taken on line 5—5 of FIGURE 3 showing the connection between the adjacent end portions of two sections of one of the pan guides, parts being shown in elevation;

FIGURE 6 is a sectional view taken on line 6—6 of FIGURE 2, parts being shown in elevation; and FIGURE 7 is an exploded enlarged view of the conveyor chain guide support and bearing therefor.

Referring to FIGURE 1, the conveying system includes a plurality of end to end related conveyors, one conveyor being shown at 10 with the adjacent end portions of communicating conveyors being shown at 12 and 14. Such conveyors may be of considerable length and a number of such conveyors may be connected in end to end relation as, for example, in commercial bakeries for transporting pans from and to various pieces of equipment such as proofers and ovens. It is desirable to handle the pans during transportation thereof in as smooth and gentle a manner as possible, particularly in the case of pans of proofed dough, since jarring thereof frequently causes collapse of the proofed dough resulting in a poor or unsalable loaf of bread.

The conveyor system includes support frames 16, 18 and 20 for the respective conveyors 10, 12 and 14, that may be formed of pipe and pipe fittings, as illustrated, or similar structural members to provide the necessary support for the conveyors and operating mechanism therefor. The adjacent ends of the support frames 16, 18 and 20 are spaced apart and are rigidly connected, as hereinafter described, by pairs of parallel laterally spaced vertical plates 22 and 24 spanning the space between the adjacent ends of the support frames 16, 18 and 20.

Each of the frames 16, 18 and 20 includes a pair of oppositely disposed laterally spaced parallel side rails 26 and 28, and transversely extending forward and rearward end rails 30 and 32. FIGURES 1 and 2 show the conveyor 10 and adjacent end portions of the conveyors 12 and 14. In the following description, the construction and arrangement of elements between the communicating ends of the conveyors will be described with particular reference to conveyors 10 and 14, it being understood that the construction and arrangement of elements between the conveyors 10 and 12 is similar in character.

Referring particularly to FIGURE 2, the rearward ends of side rails 26 and 28 of the frame 16 are received in pipe fittings 34 and 36 provided with flanges 38 and 40 engaging the outer surfaces, respectively, of the plates 22 and 24 proximate their forward end portions. In similar manner, the forward ends of side rails 26 and 28 of the frame 20 are received in pipe fittings 42 and 44 provided with flanges 46 and 48 engaging the outer surfaces, respectively, of the plates 22 and 24 proximate their rearward end portions.

The opposite ends of the rearward end rail 32 of frame 16 are provided with flanges 50 and 52, respectively, engaging the inner surfaces of plates 22 and 24 and registering with the flanges 38 and 40. Suitable means such as bolts, not shown, extending through the flanges 40, 52 and the plate 24, and through the flanges 38, 50 and the plate 22 provide a rigid connection between the frame 16 and the plates 22 and 24. In similar manner, the opposite ends of the forward end rail 30 of frame 20 are provided with the flanges 54 and 56, respectively, engaging the inner surfaces of plates 22 and 24 and registering with the flanges 46 and 48. Bolts or other suitable means, not shown, extending through the flanges 46, 54 and the plate 22, and through the flanges 48, 56 and the plate 54, provide a rigid connection between the frame 20 and the plates 22 and 24.

The frames 16, 18 and 20 also include legs 58 for supporting the conveyors in spaced relation above the floor. The legs 58 are preferably in the form of pipes, the upper ends of which are received in pipe fittings 60 that are secured in any suitable manner to the plates 22 and 24 directly beneath the pipe fittings in which the ends of the frame side rails 26 and 28 are received.

Where the conveyors are of considerable length, referring particularly to conveyor 10, the side rails 26 and 28 of the frame 16 may be made up of a plurality of sections connected by suitable fittings, for convenience in storage, shipping and assembly. As best shown in FIGURE 2, a T-fitting 62 connects sections 26' and 26" of side rail 26 and a T-fitting 64 connects sections 28' and 28" of side rail 28, with the T-fittings 62 and 64 also connecting an intermediate cross rail 66 of the frame 16. Depending on the length of the conveyors, it is evident that any desired number of side rail sections and intermediate cross rails may be connected in similar manner. Again depending on the length of the conveyors, certain of the fittings connecting the side rail sections and intermediate cross rails may be of the side outlet T-fitting type, indicated at 68 in FIGURE 1 for receiving intermediate support legs, such as 70.

Referring particularly to conveyor 10, the means for moving pans therealong in the direction indicated by arrow 71 includes a pair of parallel laterally spaced longitudinally extending endless chain belts 72 disposed between the side rails 26 and 28 of the frame 16, with the upper runs thereof being disposed above the end and intermediate cross rails 30, 32 and 66 and the lower runs thereof being disposed below the end and intermediate cross rails 30, 32 and 66. The endless chain belts 72 are trained over front sprockets 74 and rear sprockets 76, as best shown in FIGURE 2. One of the rear sprockets 76 is shown in FIGURE 6 keyed on a transversely extending shaft 78, it being understood that the other of the rear sprockets 76 is similarly keyed on the shaft 78.

The shaft 78 is disposed midway between the adjacent ends of the frames 16 and 20, one end thereof being rotatably mounted in a bearing 80 secured to the inner surface of the plate 24 and the other end thereof extending through the plate 22 and mounted in a gear reduction unit 82 carried by the outer surface of the plate 22. The operating means for the shaft 78 includes an electric motor 84 suitably mounted for vertical adjustment on a mounting plate 86 secured to the frame connecting plate 22 and depending therefrom between the adjacent ends of frames 16 and 20. Power is transmitted from electric motor 84 to the gear reduction unit 82 by suitable means such, for example, as a vari-speed pulley drive 88.

The conveyor 14 is also provided with a pair of laterally spaced endless chain belts 90, trained over front sprockets 92 which are mounted to idle on shaft 78 and are laterally offset with respect to the sprockets 76. Thus, not only is a simplified arrangement provided for the transfer of pans from conveyor 10 to conveyor 14, but with the overlapping of the adjacent ends of the conveyor chain belts 72 and 90 a smooth transfer of pans from one conveyor to the other is accomplished, and since through the arrangement above described, the conveyors 10 and 14 can also be independently driven at relatively different speeds, the spacing between successive pans transferred from conveyor 10 to conveyor 14 can be increased or decreased at will.

The construction and arrangement of elements between the adjacent ends of conveyors 10 and 12 is the same as that between the adjacent ends of conveyors 10 and 14, described above, and is therefore not described in detail. It should be noted that the front sprockets 74 of the conveyor 10 are arranged to idle on the shaft 94 just as the front sprockets 92 of the conveyor 14 are arranged to idle on shaft 78, and rear sprockets 96 of conveyor 12 are keyed on shaft 94 juts as the rear sprockets 76 of conveyor 10 are keyed on shaft 78, so that conveyor 12 may be operated independently of conveyor 10 and at relatively different speeds.

Referring particularly to conveyor 10, though applicable also to conveyors 12 and 14, a guide support 98 is provided for the upper load supporting run of each of the chain belts 72 and preferably a similar guide support 100 for the lower return run of each of the chain belts 72, whereby to provide for smooth conveyance of the pans by the conveyor 10. The guide supports 98 and 100 are supported from the end and intermediate cross rails 30, 32 and 66 in a manner hereinafter described and extend from points adjacent front sprockets 74 to points adjacent rear sprockets 76.

The guide supports 98 and 100 are identical in construction and, in describing one of the guide supports 98, it will be understood that it applies to all of the guide supports and the same reference characters are employed in designating similar elements of the various guide supports.

The guide support 98 is in the form of an elongated extrusion preferably of aluminum or an aluminum alloy. As best shown in FIGURES 3 and 7, the upper portion of the guide support 98 is in the form of an upwardly opening chain belt receiving shallow channel extending the length of the guide support 98 and defined by a flat bottom wall 102 and upwardly extending side walls 104 on opposed sides of the bottom wall 102. The upper edges of side walls 104 have integrally formed therewith laterally outwardly projecting beads 106, for a purpose to be hereinafter described. Integrally formed with the channel bottom wall 102 midway between the opposed sides thereof and extending the full length thereof is a vertical depending strengthening rib 108, the lower end of which has a tubular enlargement 110 integrally formed therewith.

A channel shaped bearing 112 is arranged to be seated in the channel portion of the guide support 98, with its bottom wall 114 and side walls 116 closely fitting the corresponding bottom and side walls 102 and 104 of the channel portion of the guide support 98. The upper ends of the bearing side walls 116 are provided with rolled-over edges 118 adapted to snap over the beads 106 upon insertion of the bearing 112 in the channel portion of the guide support 98, to retain it in place. The channel shaped bearing 112 is formed of a synthetic organic plastic such as "nylon" which is relatively hard to give a good bearing surface for the chain belts 72, that is simple to install or replace, and that provides for quiet operation and requires no lubrication.

The guide supports 98 and 100 are rigidly but adjustably supported from the end and intermediate cross rails 30, 32 and 66 of the frame 16 by means of brackets 120. One such bracket is shown in FIGURES 3 and 4 adjustably secured to the intermediate cross rail 66, it being understood that similar brackets for supporting the guide supports are also secured on the end rails 30, 32 and on all the intermediate cross rails.

The bracket 120 includes upper and lower arcuate split clamp members 122 and 124 embracing the cross rail 66 and to which they are adjustably secured by means of bolts 126 extending through the flanges 128 and 130 of the clamp members 122 and 124. The upper clamp member 122 has integrally formed therewith an upwardly and laterally curving support arm 132 provided at its free end with a flange 134 engageable with the side face of the rib 108 of the upper guide support 98. Bolts 136 extending through the flange 134 and rib 108 rigidly secure the upper guide support 98 to the bracket 120. In similar manner, a downwardly and laterally curving support arm 138 formed with lower clamp member 124 is provided at its free end with a flange 140 engaging the side face of the rib 108 of the lower guide support 100, with bolts 142 extending through flange 140 and rib 108 for rigidly securing the lower guide support 98 to the bracket 120.

For convenience in storage, shipping and assembly the guide supports are formed in a plurality of end to end related sections, the adjacent ends of two of such sections of the guide support 98 being shown in FIGURE 4 at 98′ and 98″. A dowel 144 is snugly receivable in the tubular enlargement 110 at the adjacent ends of the guide support sections 98′ and 98″, it being understood that a similar arrangement is provided between all the sections of the guide supports 98 and 100 for the purpose of properly aligning the guide support sections upon erecting of the conveyor in the field. Preferably, though not necessarily, the lengths of the sections of the guide supports are such that the bracket flanges 134 and 140 overlap the adjacent end portions of the guide support sections, as best shown in FIGURE 4.

In order to provide a fixed path for movement of the pans and to locate the pan sets so that the bottoms of the pans of the pan sets are engaged by the chain belts 72, longitudinally extending oppositely disposed side guide rails 146 are provided which are independently adjustable as hereinafter described in detail. The guide rails 146 comprise a plurality of sections, such as sections 146a, 146b, 146c and 146d, preferably in the form of pipes flexibly connected at their adjacent ends and supported for adjustment from the side rails 26 and 28 of the conveyor frames 16, 18 and 20 in a manner hereinafter described in detail. One of such flexible connections and support means is disclosed in detail in FIGURES 3 and 5, and the following description thereof applies to all of the flexible connections and support means.

The pan guide support includes a support member 148 provided with a pair of arcuate split clamp members 150 and 152 embracing the frame side rail 26 and to which they are adjustably secured by means of bolts 154 extending through the flanges 156 and 158 of the clamp members 150 and 152. Projecting laterally from the clamp member 150 are a pair of flat clamp plates 160 and 162, disposed in transverse vertical planes, the clamp plate 162 being integrally formed with the clamp member 150 and the clamp plate 160 being formed as a separate but associated part thereof.

An upright pan guide supporting post 164 is flexibly connected at its lower end with the clamp plates 160, 162 and flexibly connected at its upper end with the adjacent ends of pan guide sections 146a and 146b in a manner hereinafter described. The shank 166 of the supporting post 164 has a lower flat disc-like portion 168 and an upper internally threaded tubular portion 170. The disc-like portion 168 is disposed between the clamp plates 160 and 162 and separated therefrom by vulcanized fiber washers 172 or other suitable friction material.

A bolt 174 extends through an opening 176 in the clamp plates 160 and 162, disc-like shank portion 168, and the washers 172, and on its threaded projecting end portion is threaded a hand wheel 178. By turning hand wheel 178 the clamp plate 160, disc-like shank portion 168 and the washers 172 are drawn tightly together and against the clamp plate 162 so that shank portion 168 is normally frictionally retained in position, but is capable of being turned about the axis of the bolt 174 to any one of a number of adjusted positions by exerting manual pressure thereagainst.

The upper portion of the pan guide supporting post 164 is T-shaped, including an upright rod shaped portion 180 having its lower end threadable into the internally threaded tubular portion 170 of the shank 166, and a short rod shaped cross piece 182. The cross piece 182 has reduced end portions 184 of smaller outside diameter than the inside diameter of the tubular guide rail pipe sections 146a and 146b, so as to be insertable in the adjacent ends of the pipe sections 146a and 146b with considerable clearance therebetween. A jam nut 186 threaded on the threaded lower end of the upright rod-shaped portion 180 of the supporting post 164 is arranged to engage the upper end of the shank 166 to prevent turning of the upright rod-shaped portion 180 when in adjusted position.

O-rings 188 of suitable yieldable material embrace the reduced end portions 184 of the cross piece 182 and take up the clearance between the reduced end portions 184 and the adjacent end portions of the pipe sections 146a and 146b, thereby preventing relative radial displacement therebetween but permitting angular movement between the cross piece 182 and the pipe sections 146a and 146b limited only by the clearance between the reduced end portions 184 and the pipe sections 146a and 146b and the depth of their engagement.

From the above description it will be evident that by merely applying manual pulling or pushing force against the cross piece 182 of the pan guide supporting post 164, the adjacent ends of the pan guide sections 146a and 146b can be swung toward or away from the conveyor chain belts 72, and the similar connections between the other sections of the pan guides 146 may be manipulated in like manner so that the pan guides may be adjusted without the use of tools. It is further evident that sections of the pan guides may be laterally offset with respect to other sections thereof to centrally locate and guide the pans as they move from the chain belts 72 of one conveyor, as conveyor 10, to the offset chain belts 72 of another conveyor, as conveyor 14.

While the invention has been described above with particular reference to pan conveyors for bakeries and especially to conveyors for handling pans of proofed dough, it will be apparent that it is equally adapted for the conveyance of other articles. It will also be apparent that sections of the conveyor system may be in the form of 90 or 180 degree turns without departing from the spirit of the invention.

Each of the conveyors is shown and described as comprising a pair of laterally spaced endless chain belts and supports for the runs thereof, however, it is obvious that it may frequently be found desirable to provide additional similar intermediate endless chain belts and supports therefor.

I claim:

1. Article conveying means including a frame, an endless conveyor supported by said frame, a longitudinally extending article guide rail along each side of said endless conveyor, each of said guide rails including a plurality of end to end related guide rail sections, a plurality of upright guide support posts, means at one end of each of said guide support posts flexibly connecting the adjacent ends of a pair of end to end related guide rail sections, a plurality of brackets, one for each of said guide support posts, secured to said frame, said brackets having mounting means for supporting the opposite ends of said guide support posts including a pivotal connection for swinging said guide support posts in a plane transverse with respect to said longitudinally extending guide rails and clamping means for frictionally retaining said guide support posts in fixed position and being yieldable to manual pressure exerted against said guide support posts for pivotally swinging them to move any one pair of related ends of said guide rail sections inwardly and outwardly of said endless conveyor independently of any other pair of related ends of said guide rail sections.

2. Article conveying means including a frame, an endless conveyor supported by said frame, a longitudinally extending article guide rail along each side of said endless conveyor, each of said guide rails including a plurality of hollow tubular sections disposed in end to end spaced relation, a plurality of substantially T-shaped guide support posts, the head of each of said T-shaped guide support posts being disposed between and in abutting end to end relation with the ends of a pair of said hollow tubular guide rail sections and having reduced end portions fitting into said hollow tubular guide rail sections with substantial clearance therebetween and O-rings embracing said reduced end portions to provide a pivotal connection between said T-shaped guide support post and said hollow tubular guide rail sections, a plurality of brackets, one for each of said guide support posts, secured to said frame, said brackets having mounting means for supporting the opposite ends of said guide support posts including a pivotal connection for swinging said guide support posts in a plane transverse with respect to said longitudinally extending guide rails and clamping means for frictionally retaining said guide support posts in fixed position and being yieldable to manual pressure exerted against said head of said guide support posts for pivotally swinging them to move any one pair of related ends of said guide rail sections inwardly and outwardly of said endless conveyor independently of any other pair of related ends of said guide rail sections.

3. Article conveying means including a frame, an endless conveyor supported by said frame, a longitudinally extending article guide rail along each side of said endless conveyor, each of said guide rails including a plurality of end to end related guide rail sections, a plurality of upright guide support posts, means at one end of each of said guide support posts flexibly connecting the adjacent ends of a pair of end to end related guide rail sections, a plurality of brackets, one for each of said guide support posts, secured to said frame, each of said brackets being provided with a pair of cooperating clamp plates one of which is rigid therewith and the other of which is freely associated therewith, a bolt extending through said clamp plates, the opposite end of an upright guide support post being pivotally mounted on said bolt between said clamp plates, and means for drawing said clamp plates and the pivotally mounted end of said guide support post together for frictionally retaining said guide support post in fixed position and being yieldable to manual pressure exerted against said guide support posts for pivotal swinging movement of the same to move any one pair of related ends of said guide rail sections inwardly and outwardly of said endless conveyor independently of any other pair of related ends of said guide rail sections.

4. Article conveying means as defined in claim 3, including a washer of yieldable material disposed between said pivotally mounted end of said guide support posts and each of said cooperating clamp members.

5. Article conveying means including a frame, a pair of laterally spaced endless flexible conveyor elements to directly support said articles, guide supports for the load bearing runs of each of said flexible conveyor elements, means for securing said guide supports to said frame, said guide supports each including an upwardly opening trough shaped elongated element of extruded metal for receiving the load bearing run of an endless flexible conveyor element, the upper edges of the opposed side walls of said trough shaped elements being each provided with an enlarged outwardly projecting longitudinally extending bead, and an elongated upwardly opening trough shaped element of synthetic organic plastic material fitting within said trough shaped elongated extruded metal element to provide a bearing surface for said endless flexible conveyor element, the upper edges of the opposed side walls of said trough shaped bearing elements being each provided with an outwardly downturned portion arranged to yieldably snap over and bear against a respective bead to resiliently retain said bearing elements in said trough shaped metal elements.

6. Article conveying means including a rectangular frame having a pair of transversely spaced longitudinally extending frame members and a plurality of transversely extending frame members connecting said longitudinally extending frame members at spaced intervals between the ends thereof, a pair of laterally spaced endless flexible conveyor elements to directly support said articles, guide supports for the load bearing runs of each of said endless flexible conveyor elements, said guide supports including a plurality of end to end related sections, each including an upwardly opening trough shaped portion receiving said conveyor run, a rib extending the length of and depending from the trough shaped portion of each of said guide support sections and a hollow tubular enlargement at the free edge of each of said ribs and extending the length thereof, dowel means insertable in the adjacent ends of said hollow tubular enlargements for assembling and retaining said guide support sections in accurate alignment, brackets adjustably mounted on said transversely extending frame members, said brackets having flanges overlying adjacent rib portions of adjacent end to end related guide support sections, and means for securing said adjacent rib portions to said flanges for securing said guide support sections to said frame in aligned position.

7. Article conveying means including a rectangular frame having a pair of transversely spaced longitudinally extending frame members and a plurality of transversely extending frame members connecting said longitudinally extending frame members, a pair of laterally spaced endless flexible conveyor elements to directly support articles on the upper runs thereof, guide supports for the upper and lower runs of each of said endless flexible conveyor elements, each of said guide supports including an upwardly opening trough shaped elongated element for receiving a respective run of said endless flexible conveyor elements and a rib extending the length of and depending from the trough shaped portion of each of said guide supports, a pair of brackets mounted on each of said transversely extending frame members for slidable movement therealong, means for securing said brackets on said transversely extending frame members in any one of a number of laterally adjusted positions, each of said brackets having an upwardly extending bracket arm and a downwardly extending bracket arm, said upwardly extending bracket arms at their free ends having flanges overlying the ribs of said upper guide supports, said downwardly extending bracket arms at their free ends having flanges overlying the ribs of said lower guide supports, and means for securing said ribs to said flanges whereby adjustment of a bracket effects conjoint adjustment of the guide supports for the upper and lower runs of an endless flexible conveyor element.

References Cited in the file of this patent

UNITED STATES PATENTS

| | | |
|---|---|---|
| 653,970 | Sollmann | July 17, 1900 |
| 1,857,529 | Coppage | May 10, 1932 |
| 2,229,605 | Snyder | Jan. 21, 1941 |
| 2,747,725 | Hatch | May 29, 1956 |